UNITED STATES PATENT OFFICE 2,408,232

CHEMICAL COMPOUNDS AND PROCESSES

Herschel G. Smith, Wallingford, and Troy L. Cantrell, Lansdowne, Pa., assignors to Gulf Oil Corporation, Pittsburgh, Pa., a corporation of Pennsylvania No Drawing. Application January 7, 1946, Serial No. 639,701

5 Claims. (Cl. 260—461)

This invention relates to new chemical compounds and processes and more particularly to new aromatic amine salts of 3-methyl-butyl, 2-ethyl-hexyl orthophosphate which are useful for various technical purposes especially in the petroleum industry.

This application is a continuation-in-part of our copending application, Serial No. 453,458, filed August 3, 1942, which application is in turn a continuation-in-part of our application, Serial No. 421,842, filed December 5, 1941. Application Serial No. 453,458 became U. S. Patent No. 2,397,377 on March 26, 1946.

This invention has as an object the production of new chemical compounds that are technically useful. A further object is to prepare these new compounds by novel and easily conducted processes. A still further object is to utilize these new compounds for various technical purposes. Other objects will appear hereinafter.

These objects are accomplished in accordance with the present invention by making aromatic amine salts of 3-methyl-butyl, 2-ethyl-hexyl orthophosphate. Salts having the following formula:

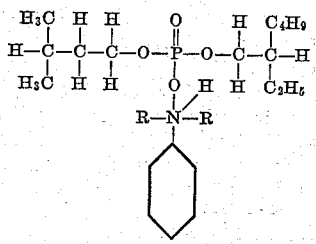

wherein R represents a substituent selected from the class consisting of methyl and ethyl groups and hydrogen, are the preferred products of the present invention.

In preparing these new salts, the selected aromatic amine is reacted with 3-methyl-butyl, 2-ethyl-hexyl orthophosphate to obtain the desired aromatic amine salt thereof; the pH of the reaction mixture being adjusted to within the range 2.0 to 5.5 in so preparing and recovering the amine salt. For example, dimethyl-aniline is brought into reaction with 3-methyl-butyl, 2-ethyl-hexyl orthophosphate, and the pH of the reaction mixture is adjusted to within the range 2 to 4. With the theoretical molecular ratio of the two reactants, namely 1:1, the product is apt to be slightly too acid, with a pH below 2, and this is taken care of by using a slight excess of the dimethylaniline so that the molecular ratio is between 1:1 and 1:1.1.

Isoamyl octyl orthophosphate, which is also called 3-methyl-butyl, 2-ethyl-hexyl orthophosphate, is a brown, oily liquid; its specific gravity is 1.009 at 24°/4° C., and its viscosity is 210, 75 and 29 centipoises at 25, 50 and 75° C. respectively.

It is insoluble in water and soluble in mineral oils to the extent of 11.70 parts in 100 parts of oil at 20° C. It has the structural formula:

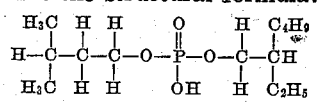

The following examples illustrate but do not limit our invention.

Example I

One hundred and twenty-one pounds of dimethylaniline were added to an iron vessel equipped with an air lance and 281 pounds of 3-methyl-butyl, 2-ethyl-hexyl orthophosphate were introduced over a period of one hour; the slow rate of addition being desirable to maintain the temperature of the reaction mixture below 185° F. At the conclusion of this reaction, the temperature was 180° F., and the pH of the mixture was 2.0. A pH of 3.0 was desired; 12.0 pounds of dimethylaniline were added, which brought the pH to 3.0. The reaction product was an oily substance, readily soluble in mineral oils and having the following properties:

| | |
|---|---:|
| Gravity: ° A. P. I. | 7.4 |
| Specific gravity, 60°/60° F. | 1.019 |
| Viscosity, S. U. V. 100° F. | 468 |
| Pour: ° F. | −50 |

The reaction product described above has the structural formula:

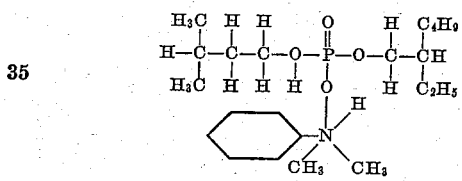

As the dimethylaniline isoamyl octyl phosphate is substantially insoluble in water, the pH equivalent is measured by the following expedient. Normal butanol (which contains a small amount of water) is adjusted to exact neutrality, pH=7.0, and the sample is dissolved therein. The pH of the solution is then measured in the ordinary way as for aqueous solutions, by electrometric or colorimetric methods. The butanol appears to serve as a blending agent, for dissolving the sample in the water.

It will be noted that the measured pH of the aminophosphate is low despite the fact that a slight excess of amine is present. This is because the reaction involves neutralizing a rather strong acid with a very weak base.

Example II

One hundred and forty-nine pounds of diethylaniline were added to an iron vessel equipped with an air lance, and 281 pounds of 3-methylbutyl, 2-ethyl-hexyl orthophosphate were introduced over a period of one hour; the slow rate of addition being desirable to maintain the temperature of the reaction mixture below 185° F. At the conclusion of this reaction, the temperature was 180° F. and the pH of the mixture was 2.0. A pH of 3.5 was desired; a further 15 pounds of diethylaniline were added, which brought the pH to 3.5. The reaction product was an oily liquid which was readily soluble in mineral oils.

The reaction product of diethylaniline with 3-methyl-butyl, 2-ethyl-hexyl orthophosphate has the following structural formula:

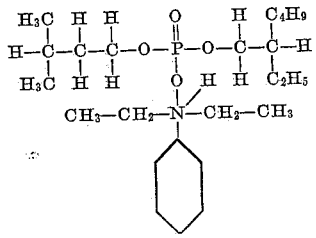

As the diethylaniline isoamyl octyl phosphate is substantially insoluble in water, the pH equivalent is measured by the expedient described above in Example I. Here again, the measured pH of the amino-phosphate is low despite the fact that a slight excess of amine is present.

*Example III*

Ninety-three pounds of aniline were added to an iron vessel equipped with an air lance and 281 pounds of 3-methyl-butyl, 2-ethyl-hexyl orthophosphate were introduced over a period of one hour; the slow rate of addition being desirable to maintain the temperature of the reaction mixture below 212° F. At the conclusion of this reaction, the temperature was 180° F. and the pH of the mixture was 2.0. A pH of 3.5 was desired; a further 9 pounds of aniline were added, which brought the pH to 3.5. The reaction product was an oily liquid which was readily soluble in mineral oils.

The reaction product of aniline with 3-methyl-butyl, 2-ethyl-hexyl orthophosphate has the following structural formula:

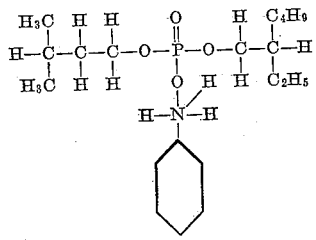

As the aniline isoamyl octyl phosphate is substantially insoluble in water, the pH equivalent is measured by the following expedient. Normal butanol (which contains a small amount of water) is adjusted to exact neutrality, pH=7.0, and the sample is dissolved therein. The pH of the solution is then measured in the ordinary way as for aqueous solutions, by electrometric or colorimetric methods. The butanol appears to serve as a blending agent for dissolving the sample in water.

It will be noted that the measured pH of this aminophosphate is low despite the fact that a slight excess of amine is present. This is because the reaction involves neutralizing a rather strong acid with a very weak base. Moreover, traces of mono-, di- and tribasic acids may be formed under the conditions of the pH determination.

While aniline 3-methyl-butyl, 2-ethyl-hexyl phosphate is an effective foam suppressor for use in lubricating oils, it is more advantageous to employ the foam suppressors prepared from 3-methyl-butyl, 2-ethyl-hexyl phosphate and dimethyl or diethyl aniline. This advantageous class of foam suppressors may be represented by the following formula:

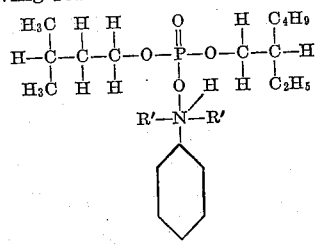

wherein R' represents a methyl or ethyl group.

While the preparation of the aniline, dimethylaniline, and diethylaniline salts of 3-methyl-butyl, 2-ethyl-hexyl orthophosphate has been specifically described above, this invention is not so limited but pertains broadly to the preparation of any aromatic amine salt of 3-methyl-butyl, 2-ethyl-hexyl orthophosphate. Among the aromatic amines which may be used to prepare such salts there may be mentioned aniline, ortho-toluidine, meta-toluidine, para-toluidine, the various isomeric xylidines, the anisidines, the phenetidines, the nitroanilines, the chloroanilines, the aminophenols, the aminocresols, the phenylene diamines, the aminobiphenyls, alpha-naphthylamine, beta-naphthylamine, N-methyl aniline, N-ethyl aniline, N-methyl beta-naphthylamine, diphenylamine, phenyl beta-naphthylamine, N-dimethyl aniline, N-diethyl aniline, N-dibutyl aniline, N-diamyl aniline, N-methyl diphenylamine, N-methyl phenyl beta-naphthylamine, N-dimethyl alpha-naphthylamine, etc.

While our invention has been described above with reference to various specific examples and embodiments, it will be understood that the invention is not limited to such illustrative examples and embodiments, but may be variously practiced within the scope of the claims herein made.

What we claim is:

1. An aromatic amine salt of 3-methyl-butyl, 2-ethyl-hexyl orthophosphate.

2. An aromatic amine salt of 3-methyl-butyl, 2-ethyl-hexyl orthophosphate having the formula:

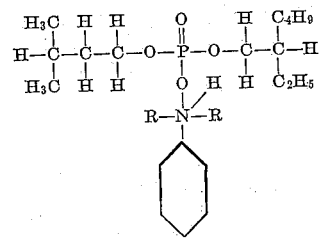

wherein R represents a substituent selected from the class consisting of methyl and ethyl groups and hydrogen.

3. The aniline salt of 3-methyl-butyl, 2-ethyl-hexyl orthophosphate.

4. The dimethylaniline salt of 3-methyl-butyl, 2-ethyl-hexyl orthophosphate.

5. The diethylaniline salt of 3-methyl-butyl, 2-ethyl-hexyl orthophosphate.

HERSCHEL G. SMITH.
TROY L. CANTRELL.